United States Patent
Ngai et al.

(10) Patent No.: US 11,820,878 B2
(45) Date of Patent: Nov. 21, 2023

(54) ULTRA-STABLE AQUEOUS FOAMS CONTAINING HIGHLY HYDROPHOBIC PARTICLES AND HYDROPHILIC POLYMERS AND THEIR DERIVATED FUNCTIONAL MATERIALS

(71) Applicant: The Chinese University of Hong Kong, Hong Kong (CN)

(72) Inventors: To Ngai, Hong Kong (CN); Yifeng Sheng, Hubei (CN); Kuan Ting Lin, Kaohsiung (TW)

(73) Assignee: The Chinese University of Hong Kong, Hong Kong (CN)

( * ) Notice: Subject to any disclaimer, the term of this patent is extended or adjusted under 35 U.S.C. 154(b) by 503 days.

(21) Appl. No.: 17/026,896

(22) Filed: Sep. 21, 2020

(65) Prior Publication Data
US 2021/0108044 A1  Apr. 15, 2021

Related U.S. Application Data

(60) Provisional application No. 62/912,789, filed on Oct. 9, 2019.

(51) Int. Cl.
*C08J 9/30* (2006.01)
*C08K 3/36* (2006.01)
*C08J 9/00* (2006.01)

(52) U.S. Cl.
CPC ............... *C08J 9/30* (2013.01); *C08J 9/008* (2013.01); *C08J 9/0061* (2013.01); *C08K 3/36* (2013.01); *C08J 2201/032* (2013.01); *C08J 2301/02* (2013.01); *C08J 2329/04* (2013.01); *C08J 2377/00* (2013.01); *C08J 2489/00* (2013.01)

(58) Field of Classification Search
CPC ..... C08J 9/30; C08J 9/006; C08J 9/008; C08J 2201/032; C08J 2301/02; C08J 2329/04; C08J 2377/00; C08J 2489/00; C08J 9/0066; C08J 9/009; C08K 3/36; C08K 2201/011; C08K 9/06; A62D 1/0071; A62D 1/0078
See application file for complete search history.

(56) References Cited

PUBLICATIONS

Fujii, S. et al., "Stimuli-Responsive Bubbles and Foams Stabilized with Solid Particles", Langmuir, 2017, 33:7365-7379, American Chemical Society.
Rio, E. et al., "Unusually stable liquid foams", Advances in Colloid and Interface Science, 2014, 205:74-86, Elsevier B.V.
Yu, K. et al., "Foaming Behavior of Polymer-Coated Colloids: The Need for Thick Liquid Films", Langmuir, 2017, 33:6528-6539, American Chemical Society.
Gozenbach, U.T. et al., "Ultrastable Particle-Stabilized Foams", Angew. Chem. Int. Ed., 2006, 45:3526-3530, Wiley-VCH Verlag GmbH & Co. KGaA, Weinheim.
Binks, B.P. et al., "Origin of stabilization of aqueous foams in nanoparticle-surfactant mixtures", Soft Matter, 2008, 42373-2382, The Royal Society of Chemistry.
Binks, B.P. et al., "Effect of pH and Salt Concentration on the Phase Inversion of Particle-Stabilized Foams", Langmuir, 2007, 23:9143-9146, American Chemical Society.
Jin, H. et al., "Super stable foams stabilized by colloidal ethyl cellulose particles", Soft Matter, 2012, 82194-2205, The Royal Society of Chemistry.
San-Miguel, A. et al., "Infuence of Nanoscale Particle Roughness on the Stability of Pickering Emulsions", Langmuir, 2012, 28:12038-12043, American Chemical Society.
Kwok. M.H. et al., "Comparing the Relative Interfacial Affnity of Soft Colloids With Different Crosslinking Densities in Pickering Emulsions", Frontiers in Chemistry, May 2018, 6(148):1-12.
De Folter, J.W.J. et al., "Oil-in-water Pickering emulsions stabilized by colloidal particles from the water-insoluble protein zein", Soft Matter, 2012, 8:6807-6815, The Royal Society of Chemistry.

*Primary Examiner* — Irina S Zemel
(74) *Attorney, Agent, or Firm* — Saliwanchik, Lloyd & Eisenschenk

(57) ABSTRACT

Ultra-stable aqueous foam comprises hydrophobic silica particles residing within bubbles in an aqueous solution of a hydrophilic polymer, a protein, or aqueous dispersible colloidal particles. The combination of the hydrophobic and hydrophilic components stabilizes the foam interfaces to result in long term stability of the foam. The foams can be crosslinked to stable monolithic foams and used for structural foams, coatings, and thermal insulating for construction.

14 Claims, 13 Drawing Sheets

FIG. 1A
FIG. 1B
FIG. 1C
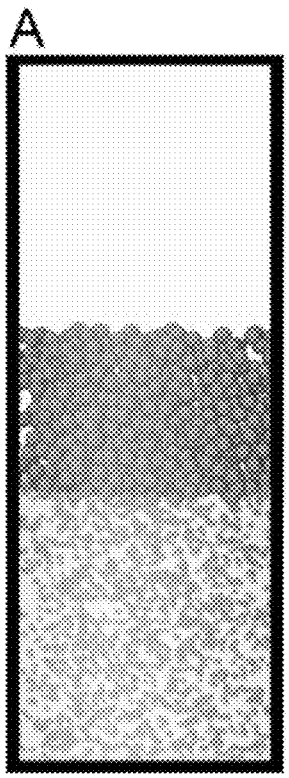
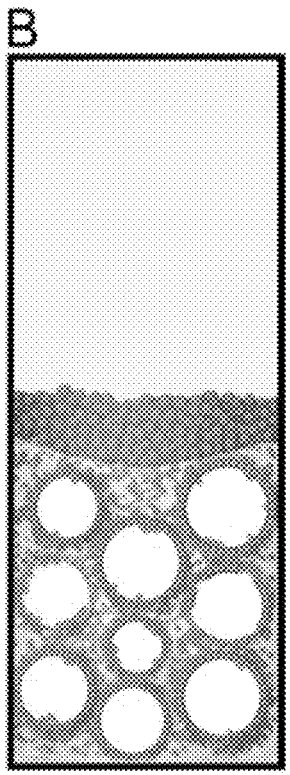
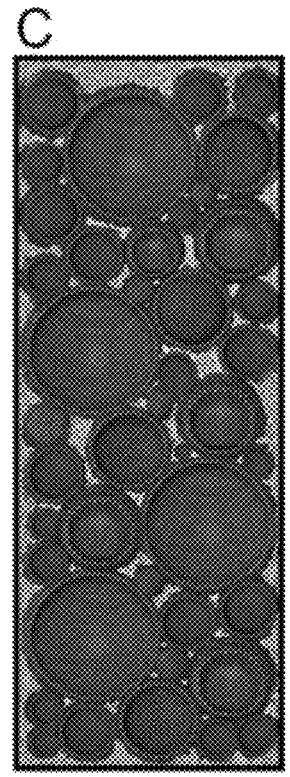
● Hydrophobic particles   ● Hydrophilic colloids   ● Aqueous phase
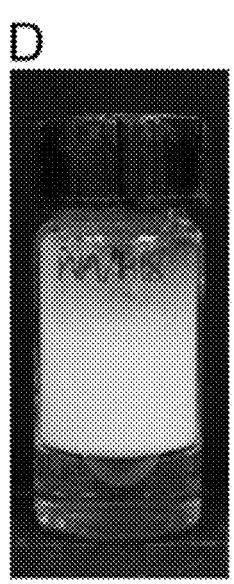
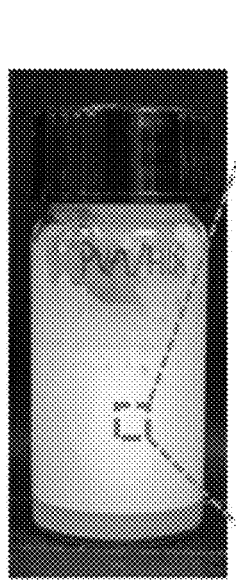
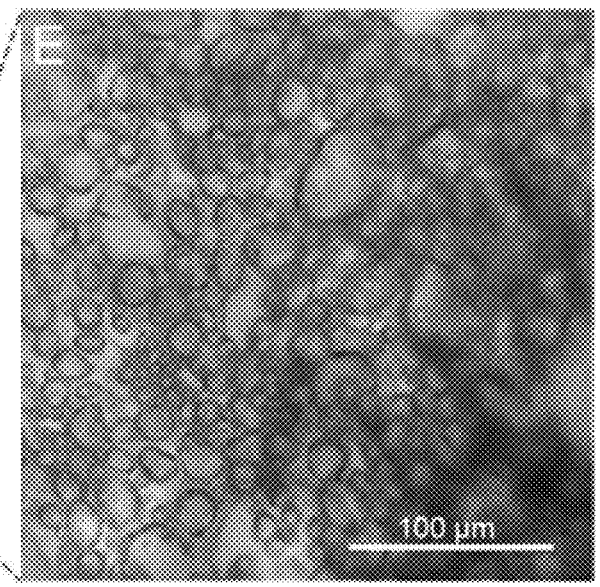
FIG. 1D
FIG. 1E

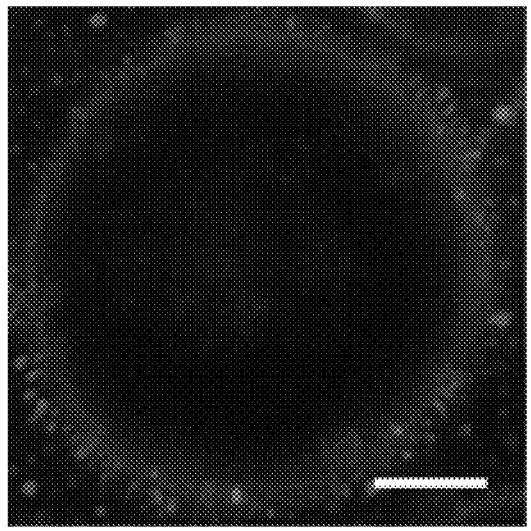
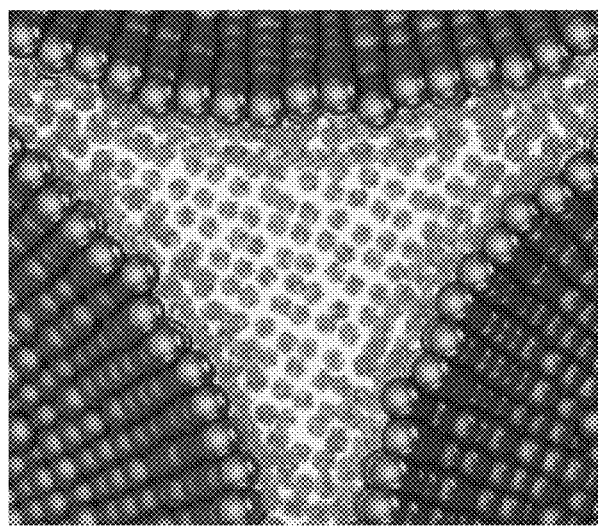
FIG. 3E  FIG.3F
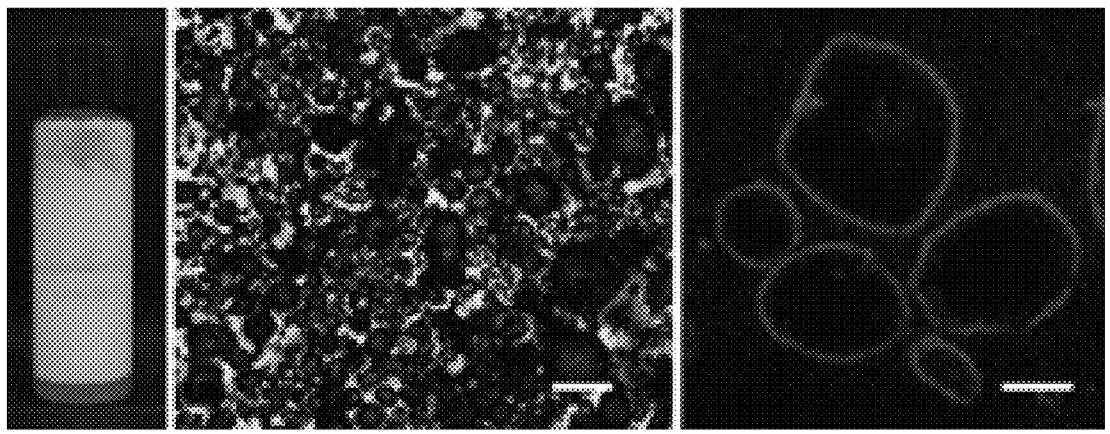
FIG. 4A

ULTRA-STABLE AQUEOUS FOAMS CONTAINING HIGHLY HYDROPHOBIC PARTICLES AND HYDROPHILIC POLYMERS AND THEIR DERIVATED FUNCTIONAL MATERIALS

CROSS-REFERENCE TO RELATED APPLICATION

This application claims the benefit of U.S. Provisional Application Ser. No. 62/912,789, filed Oct. 9, 2019, the disclosure of which is hereby incorporated by reference in its entirety, including all figures, tables and drawings.

BACKGROUND OF THE INVENTION

Foams are dispersions of gas bubbles in a continuous liquid or solid phase and among these, wet foams (gas-in-liquid systems) are practically important. These foams are ubiquitous in nature, such as those produced from beer, on the sea, or by numerous creatures for nests. Foams are also an end product in many industrial applications ranging from froth flotation, fire extinguishing, to cosmetics and foods. Wet foams are used as an intermediate template to fabricate low-weight porous materials for thermal insulating and load bearing in construction, as well as templates to produce artificial implants and scaffolds for tissue engineering in biomedicine. However, most practical applications require long-term stable wet foams, which contradict their natural thermodynamic instability. Therefore, foam stabilizers such as surfactants, polymers, or proteins are added, alone or mixed together, to kinetically stabilize foams. Nevertheless, low-molar-mass stabilizers, whose desorption energy is comparable to thermal energy, constantly adsorb and desorb from interfaces on a rapid time scale failing to retard or inhibit the destabilization processes.

However, colloidal particles have been recognized as favorable stabilizers in many frothing processes. These particle-stabilized foams are often termed Pickering foams. Using particles rather than surfactants or proteins to stabilize foams generally minimizes bubble coalescence and disproportionation, since, once the particle is adsorbed at the air-water interface, it is effectively trapped there such that particle attachment is irreversible. Once critical interfacial particle coverage is reached, further bubble coalescence and coarsening are effectively inhibited, and the resulting foam can remain stable for many months or even longer.

A wide range of particles has been used as a Pickering foam stabilizer, including minerals, polymeric particles, and others. The attachment of solid particles at the air-water interface to stabilize the foam is influenced by the particles, or particle aggregates, wettability, which is often represented by the three-phase contact angle ($\theta$). It has been demonstrated that particles with contact angles around 60° to 70° are the most favorable foam stabilizer, while hydrophobic particles, with contact angles that are greater than 90°, commonly serve as defoamers and preferentially stabilize liquid marbles (water-in-air materials). It was demonstrated that partially hydrophobic particles can attach to air-water interfaces and stabilize bubbles in surfactant-free suspensions. Feasible particle stabilizers could exhibit a critical contact angle that is higher than 90°, with optimum contact angle that may be close to 120°. It was further demonstrated that in the appropriate range of contact angles, an increase in the hydrophobicity of the particle surface would enhance foamability and foam stability, and a small deviation from the optimum condition would result in dramatic changes in these parameters.

However, efforts have been limited with respect to the nature of the particles, involving expensive and time-consuming surface modification and special dispersion and/or foaming processes, which are ineffective at achieving a sufficient concentration of modified particles in the aqueous phase. More feasible routes to modify particle wettability have been proposed recently. (Fujii et al. *Langmuir* 33, 7365-79 (2017) and Rio et al. *Advances in Colloid and Interface Science* 205, 74-86 (2014)). Typically, efforts have been directed to adjusting the particle wettability through in-situ surface modification. The adjustment usually involves adsorption of surfactant, (Yu K, et al. *Langmuir* 33, 6528-39 (2017), Gonzenbach et al *Angewandte Chemie International Edition* 45, 3526-30 (2006) and Binks et al. *Soft Matter* 4, 2373-82 (2008)) addition of electrolyte (Binks et al. *Langmuir* 23, 9143-9146 (2007) and Jin et al. *Soft Matter* 8, 2194-205 (2012)) or surface roughness modification (San-Miguel et al. *Langmuir* 28, 12038-43 (2012)) in order to favor particle wetting at the interface. To this end, stabilization of foams without in-situ surface modification is of interest.

Current polymeric foams rely on the incorporation of environmentally hazardous fire-retardant additives to meet fire safety requirements. Hence, there is an urgent need to develop composite foams with fire-retardant and self-extinguishing properties.

BRIEF SUMMARY OF THE INVENTION

Embodiments of the invention are directed to ultra-stable aqueous foam in which a multiplicity of hydrophobic particles resides within foam bubbles in an aqueous solution of a hydrophilic polymer, a protein, or aqueous dispersible colloidal particles. By using appropriate ratios and concentrations of the hydrophobic particles and the hydrophilic polymer, the protein, or the aqueous dispersible colloidal particles, foams that are stable at ambient conditions can be formed. In certain embodiments, the hydrophobic particle to hydrophilic colloid ratio can be 3:4 to 20:1 and the concentration of the hydrophilic polymer, the protein, or the aqueous dispersible colloidal particles can be about 0.1 to about 10 wt. %. The hydrophobic silica particles can be polydimethylsiloxane, or alkylated or perfluorinated silica particles with a surface area of about 150 to about 350 m²/g. Hydrophobic polymeric particles, such as polytetrafluoroethylene (PTFE), can be used. The hydrophilic polymer can be polyvinyl alcohol (PVA), polyethylene glycol (PEG), polyvinylpyrrolidone (PVP), or methyl cellulose. The protein can be bovine serum albumin (BSA). The aqueous dispersible colloidal particles can be poly(N-isopropyl acrylamide) (PNIPAM)-based microgels or cross-linked zein protein. A crosslinker can be included, such as, for example, glutaraldehyde. The foam can include a second particle, for example, hydrophilic silica particle or ethyl cellulose powder. In an embodiment of the invention, by curing the crosslinker comprising foam formulation, a porous monolith is formed.

An embodiment of the invention is directed to a method to prepare the ultra-stable aqueous foam by adding hydrophobic particles to the solution or the aqueous dispersion to form a mixture, and agitating the mixture to form the ultra-stable aqueous foam. Agitating can be shaking, stirring, homogenizing or high shear mixing. The homogenized formulation can include crosslinkers to yield foams that can be employed as coatings or extruded as an ink to form a shaped monolith.

BRIEF DESCRIPTION OF THE DRAWINGS

FIG. 1A-E Schematic illustration to fabricate ultra-stable Pickering foams using a combination of hydrophobic particles and hydrophilic polymer: (A) initial stage, (B) metastable stage with partially coated bubbles and (C) final stable state after drainage and bubble coalescence. Unshaded area indicates the air phase. (D) Images of H18 silica on top of PVA solution before frothing (left) and foam prepared from 0.3 g H18 silica particles and 3 g of 5 wt % PVA solution (right). (E) Optical microscopy image of foam in (d), scale bar=100 m.

FIG. 3E shows a CLSM image of foam stabilized by 0.1 g of perylene-labelled H18 silica with 5 g of 0.5 wt. % RB-labelled PNIAPM microgel solution, according to an embodiment of the invention, where the scale bar=10 µm, and where the H18 silica is blue features and red features are the microgels.

FIG. 3F shows a schematic illustration of the Janus bilayer comprising a particle-polymer, protein, or colloidal particle bilayer around air bubbles comprising hydrophobic particles and hydrophilic polymer molecules or colloids, according to an embodiment of the invention.

FIG. 4A shows optical and CLSM images of fluorescent PNIPAM-co-MAA microgels (3 g; 2 wt. %) with H18 silica particles (0.3 g), according to an embodiment of the invention, where scale bar for optical image=200 µm, scale bar for CLSM image=50 µm, where the microgels are the light features in the right image.

DETAILED DISCLOSURE OF THE INVENTION

Figure 2A:
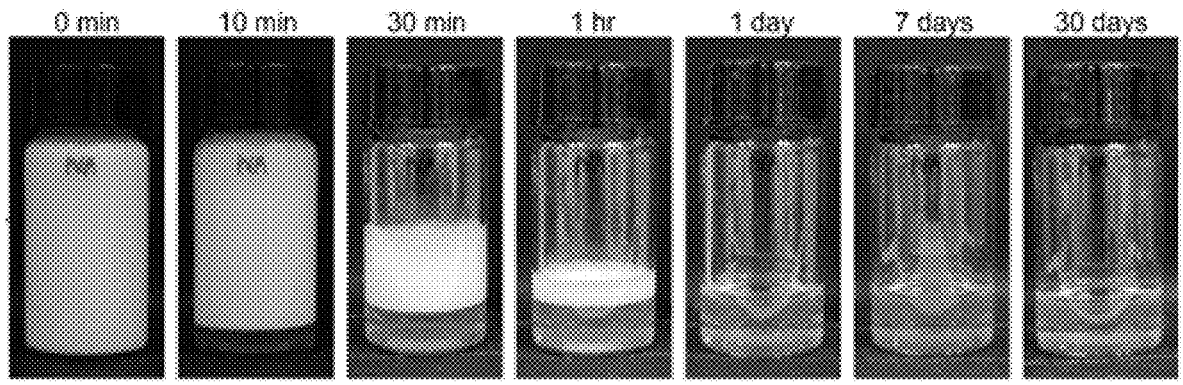
FIG. 2A shows photographs of foams from 3 g of 5 wt. % PVA solution over various periods of time from formation.

Ranges provided herein are understood to be shorthand for all of the values within the range. For example, a range of 1 to 20 is understood to include any number, combination of numbers, or sub-range from the group consisting 1, 2, 3, 4, 5, 6, 7, 8, 9, 10, 11, 12, 13, 14, 15, 16, 17, 18, 19 and 20, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

As used herein a "reduction" means a negative alteration, and an "increase" means a positive alteration, wherein the negative or positive alteration is at least 0.001%, 0.01%, 0.1%, 0.5%, 1%, 5%, 10%, 15%, 20%, 25%, 30%, 35%, 40%, 45%, 50%, 55%, 60%, 65%, 70%, 75%, 80%, 85%, 90%, 95% or 100%.

The transitional term "comprising," which is synonymous with "including," or "containing," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention. Use of the term "comprising" contemplates other embodiments that "consist" or "consist essentially of" the recited component(s).

Unless specifically stated or obvious from context, as used herein, the term "or" is understood to be inclusive. Unless specifically stated or obvious from context, as used herein, the terms "a," "and" and "the" are understood to be singular or plural.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

Forming Ultra-Stable Aqueous Foams

Embodiments of the invention are directed to a method of forming ultra-stable aqueous foams by frothing hydrophobic silica particles with critical amounts of hydrophilic polymers, colloidal particles, or a mixture thereof, in a water phase, as shown in the schematic in FIGS. 1A-E. In certain embodiments, a critical amount of hydrophilic polymer allows the hydrophobic particles and polymer to co-adsorb at bubble surfaces, forming a mixed monolayer that synergistically stabilizes the foam bubbles. Introducing a hydrophilic component allows the avoidance of particle surface modification or functionalization for foam stabilization. This allows a broad range of suitable particles that is scalable for foam. The method allows a high concentration of hydrophobic particles to be dispersed directly in air and enables stabilization of a large air-water interfacial area from coalescence, drainage and disproportionation. Embodiments of the invention are directed to stable aqueous foams from various hydrophobic particle-hydrophilic polymer combinations. Because of the enhanced stability of the foams, in embodiments of the invention, bulk lightweight and load-bearing porous materials are produced that exhibit fire-retardant and self-extinguishing properties.

In certain embodiments, the ultra-stable aqueous foam is formed by adding hydrophobic particles to an aqueous solution of a hydrophilic polymer or a protein or an aqueous dispersion of aqueous dispersible colloidal particles and then agitating the mixture to form the ultra-stable aqueous foam.

Figure 2B:
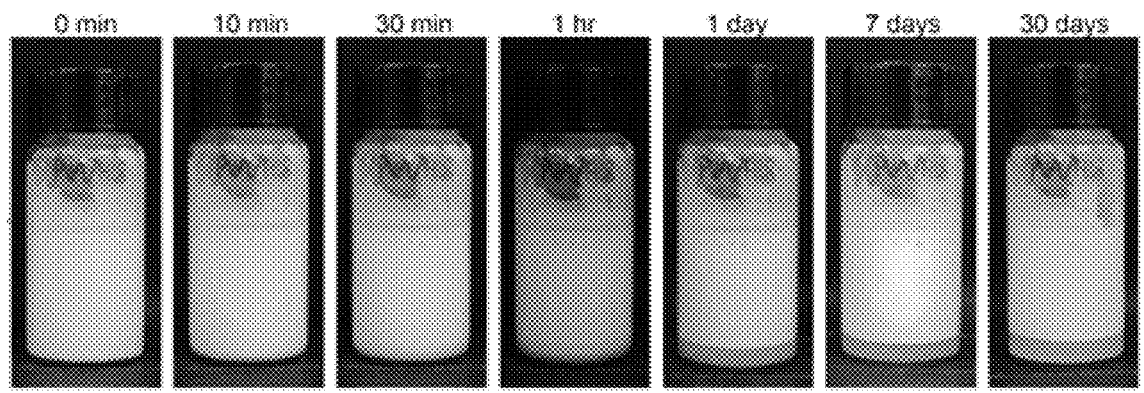
FIG. 2B shows photographs of ultra-stable foams, according to an embodiment of the invention, from 3 g of 5 wt. % PVA solution combined with 0.3 g of H18 silica particles over various periods of time from formation.
Figure 2C:
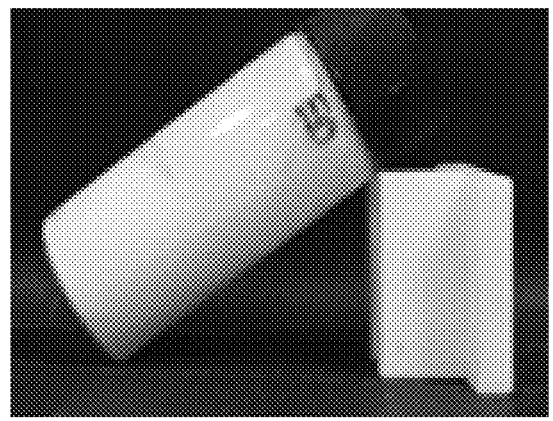
FIG. 2C shows a photograph of ultra-stable foams, according to an embodiment of the invention, from 3 g of 5 wt % PVA solution combined with 0.3 g of H18 silica particles after 6 months of time from formation.

Using hydrophobic microparticles, such as, for example, polydimethylsiloxane functionalized silica, perfluorinated alkyl functionalized silica, alkylated silica particles, H18 silica or nanoparticles in air in the absence of any additive in the aqueous phase, no foaming occurs as these particles act as a foam destabilizer. However, according to an embodiment of the invention, by adding a critical amount of a hydrophilic polymer, such as, for example, poly(vinyl alcohol) (PVA), poly(ethylene glycol) (PEG), polyvinylpyrrolidone (PVP), or methyl cellulose, which can be dissolved in water, to the hydrophobic particles a large amount of foam is formed upon frothing due to agitation of the mixture, as shown in FIG. 1E, where the bubble diameters varies between 1 and 50 µm. In the absence of hydrophobic particles, the hydrophilic foams rapidly collapse, as shown in FIG. 2A. In contrast, a foam resulting from hydrophobic particles and a hydrophilic polymer solution, preferably resulting from 0.3 g of H18 silica particles and 3 g of a 5 wt. % PVA solution, shows no significant change over 7 days, as shown in FIG. 2B and even after 6 months, as shown in FIG. 2C.

In certain embodiments, hydrophobic microparticles can be combined with hydrophilic polymers, such as, for example, poly(vinyl alcohol) (PVA), poly(ethylene glycol) (PEG), polyvinylpyrrolidone (PVP), or methyl cellulose; aqueous dispersible colloidal particles, preferably microgels, such as, but not limited to, poly(N-isopropyl acrylamide) (PNIPAM) or crosslinked zein protein particles from maize; or other proteins, such as bovine serum albumin (BSA) to form foams. In certain embodiments, the hydrophilic polymer, protein or aqueous dispersible colloidal particle is at a concentration of about 0.1 to 10 wt. %. In certain embodiments, a cross-linking protein can be added to create the ultra-stable foam. Preferably the cross-linker is used in conjunction with the zein protein; and, the cross-linker is preferably glutaraldehyde, genipin, or polyphenol.

In certain embodiments, additional small molecules or small particle additives can be added to create the foam. The small molecules or particles can include hydrophilic silica particles, mineral particles, ethyl cellulose powder, inorganic salts, or melamine.

In certain embodiments, the mixture is agitated while the each of the components of the mixture is added; or the mixture is agitated after each of the components is added. Agitating can be shaking, stirring, homogenizing or high shear mixing.

Due to the excellent interfacial activity, PVA or other hydrophilic particles dispersed in water, produce and cover a large number of bubbles during the frothing process, which provides sufficient inner space for the intake of hydrophobic particles, which spontaneously attach to the interface to form a shell at the bubble surface. As a result, a mixed layer with both hydrophilic polymer or colloid and hydrophobic particle generates at the interface. A dispersion of bubbles with a highly hydrophobic shell in water is thermodynamically unfavorable, however hydrophilic particles decrease the air-water surface tension and adsorb at the interface to balance the hydrophobicity of the bubbles, enabling the hydrophobic particles to stabilize the foam. The hydrophilic particles also inhibit direct contact and fusion of the hydrophobic particle shells. These irreversibly adsorbed and densely packed super-hydrophobic silica particles build a rigid particle network at the interface that inhibits bubble shrinkage and coalescence to yield an ultra-stable Pickering microstructure, according to embodiments of the invention.

Compositions of Ultra-Stable Aqueous Foams

Figure 5:
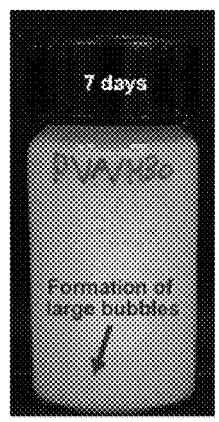
FIG. 5 is a photograph of foam prepared from PVA and low hydrophobicity silica particles, where the stability is poorer than the ultra-stable foams according to an embodiment of the invention.

Structured foams by bilayer stabilizing air bubbles can be created with a wide variety of hydrophilic polymers, proteins, and microgel particles, according to embodiments of the invention. Polymers include PVA, polyethyleneimine (PEI), polyethylene glycol (PEG), methyl cellulose. Proteins include bovine serum albumin (BSA). Soft microgel particles include poly(N-isopropyl acrylamide) (PNIPAM)-based microgels and cross-linked zein protein particles. Superhydrophobic silica particles, such as H18 silica and perfluorinated silica N20 particles, can be used to form the stable foams. Various combinations that form the stabilizing bilayers are illustrated in FIGS. 4A-4D. The ratio of the hydrophobic particles to the hydrophilic polymer, protein, or aqueous dispersible colloidal particle can be about 3:4 to about 20:1, about 1:1 to about 7:1, or about 3:1 to about 4:1. The hydrophobicity of the incorporated particles affects the foam stability. FIG. 5 shows foam prepared using less hydrophobic H30 silica particles after seven days, which shows that the stability of the foams is greatly reduced.

Figure 6A:
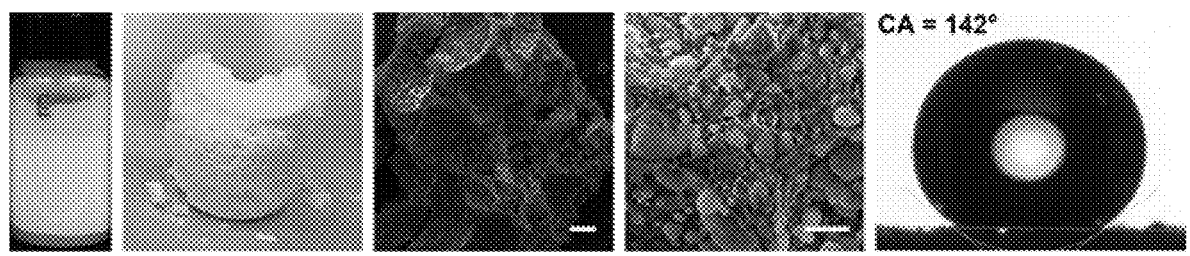
FIG. 6A shows photographs of a solidified H18 silica-PVA foams, according to an embodiment of the invention, for a slow crosslinking formulation of five days before and after removal of the gelled foam and SEM images of different magnification showing the air generated pores and the decoration on the inner surface of the pores with scale bars of 200 µm and 50 µm, respectively, and a photograph of a water droplet displaying a high contact angle (CA) of 142°.
Figure 6B:
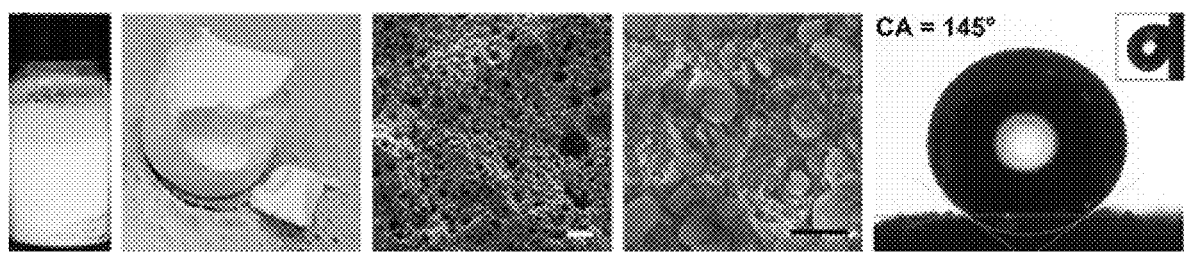
FIG. 6B shows photographs of a solidified H18 silica-PVA foams, according to an embodiment of the invention, for a fast crosslinking formulation of several minutes before and after removal of the gelled foam and SEM images of different magnification showing the air generated pores and the decoration on the inner surface of the pores with scale bars of 200 µm and 50 µm, respectively, and a photograph of a water droplet displaying a high contact angle (CA) of 145°.
Figure 6C:
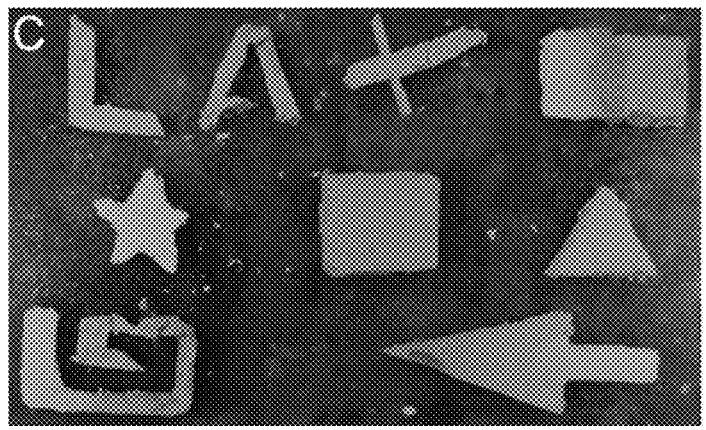
FIG. 6C shows mold-casting of the wet H18 silica-PVA foam cross-linked by glutaraldehyde.
Figure 6D:
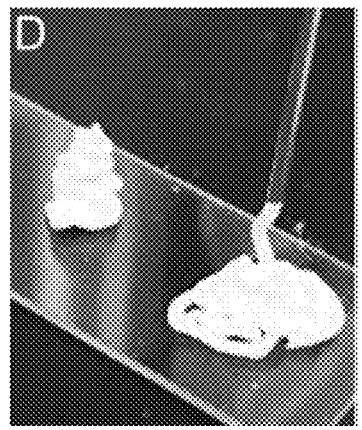
FIG. 6D shows printing of the wet H18 silica-PVA foam incorporating melamine resin in the initial aqueous phase.
Figure 6E:
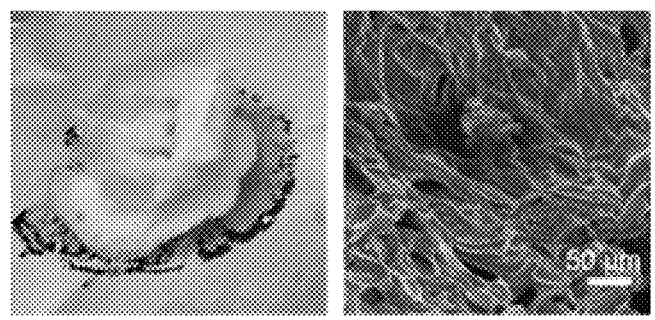
FIG. 6E shows a photograph of crosslinked PVA foam with a fast crosslinking formulation of several minutes and an SEM image of the collapsed void structure.
Figure 6F:
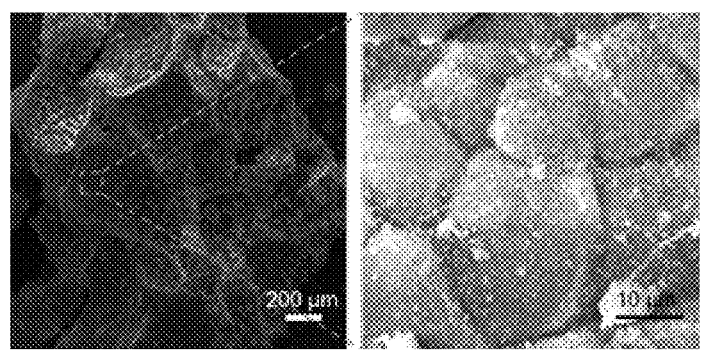
FIG. 6F shows an SEM image of an inner surface of the pores in dried foam, according to an embodiment of the invention.

Foam templating is a widely used methodology for the preparation of three-dimensional hierarchical porous materials. However, most traditional foams lack sufficient stability for further cross-linking reactions and fail to maintain three-dimensional structure during drying. In contrast, the mixed monolayer on bubble surfaces of the composite foams, according to embodiments of the invention, reach an equilibrium state without further drainage and coalescence, allowing the foams to be solidified. As shown in FIG. 6A, cross-linking of PVA in water resulted in a H18 silica-PVA monolith which had excellent resistance to collapse and shrinkage during drying in comparison to pure PVA foams, as shown in FIG. 6E. Dried foam consists of pores originating from the original gas bubbles and shows promise as a lightweight, load-bearing functional material where the densely packed silica particles and polymer mixed monolayer reinforces the walls of the pores to enhance mechanical strength. The cross-linking speed regulates the micro-structure of the resulting dry foams. Under slow cross-linking conditions, the H18 silica-PVA monoliths display a closed-cell structures, with large bubbles dispersing in the composite network formed by coalescence of smaller bubbles without sufficient particle coverage. The high magnification images clearly show that the H18 silica particles were adsorbed at the air-water interface from the air phase, while PVA molecules formed a thin film on the outside of the hydrophobic shells, as shown in FIG. 6E. More stable bubbles are forced into each other during water drainage, making isolation barriers between the merging bubbles, similar to the structure of foamed emulsions. Since all H18 silica particles face air, the porous structure renders the whole monolith super-hydrophobic with a contact angle of 142°. Fast cross-linking inhibited drainage and bubble coalescence, this results in the formation of monoliths with smaller pore sizes, as shown in FIG. 6B. In addition, lots of uncovered PVA layers leave bubbles with incomplete bilayer structures during the stage before coalescence and ripening that are bare in the wet foams after frothing and cross-linking, resulting in a super-hydrophobic surface that is decorated with hydrophilic patterns, demonstrating a high contact angle and present a rose petal effect, as indicated in the small insert to the photo for CA measurement.

Uses of Ultra-Stable Aqueous Foams

Figure 7A:
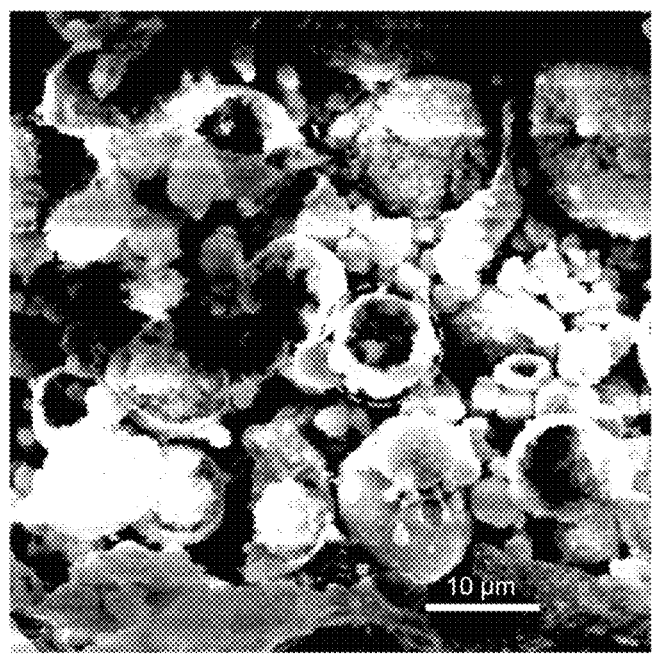
FIG. 7A shows an SEM image of foam prepared with 0.3 g of H18 silica particles and 0.15 g in PVA in a 3.0 g aqueous phase with 0.15 g melamine resin precursor in the initial aqueous phase after drying, where the circle marks a hollow sphere from the bubble.
Figure 7B:
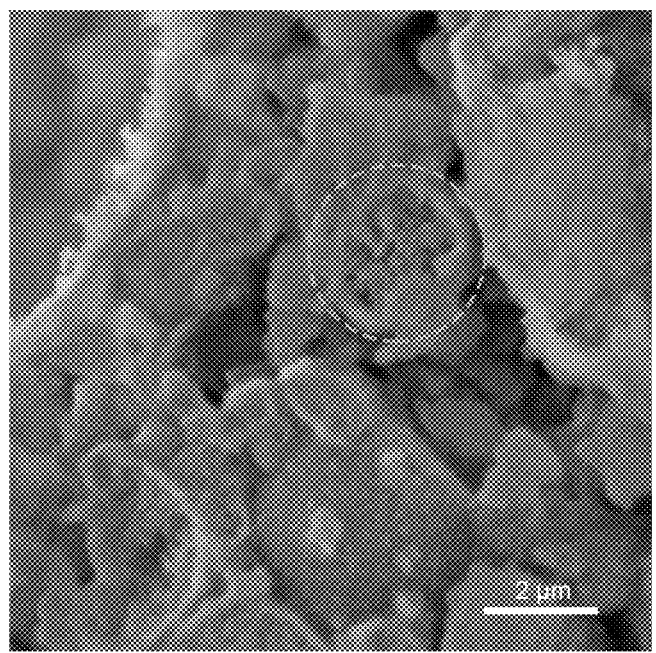
FIG. 7B shows an SEM image of the foam prepared with 0.3 g of H18 silica particles and 0.15 g in PVA in a 3.0 g aqueous phase with 0.06 g carboxymethyl cellulose sodium in the initial aqueous phase after drying, where the circle marks a hollow sphere from the bubble.
Figure 8A:
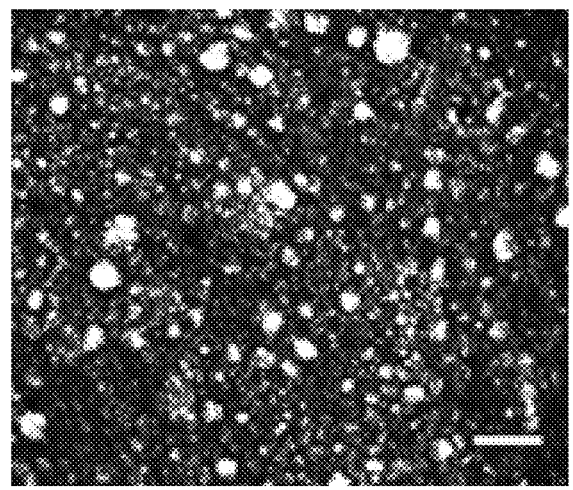
FIG. 8A shows a microscope image of a dried coating templated from H18 silica-PVA-$CaCO_3$ flame retarding foam, according to an embodiment of the invention on a glass slide, with a scale bar=200 µm.
Figure 8B:
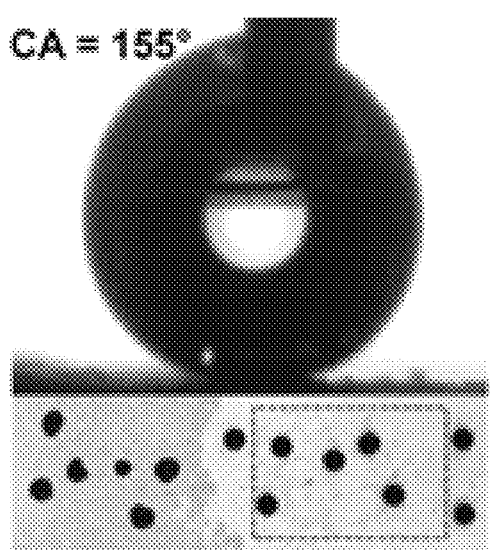
FIG. 8B shows a photograph of a water droplet on the coating of FIG. 8A on a polyurethane (PU) sponge, having a contact angle of 155°.

Mold-casting, which is widely used in fabrication processes, is inexpensive and easy to control. Due to the high controllability of the wet foams, they are excellent materials amenable to this technique. Under relatively slow cross-linking, the wet foams behaved like viscous liquids and can be easily transferred into different molds by hand, forming porous monoliths with various shapes after cross-linking (FIG. 6C). Furthermore, the formulated foams, preferably Pickering foams, exhibit a paste-like viscosity before cross-linking, and are suitable for injection molding or printing (FIG. 6D). The 3D structures of the monoliths can be regulated by the compounds incorporated. In certain embodiments, amines and cellulose derivatives can be synergistically crosslinked with PVA by formaldehyde and glutaraldehyde. As a result, when melamine or carboxymethyl cellulose are incorporated in the aqueous solution, a stable but rigid polymer shell forms at the interface, leaving a hollow capsule in-situ templated from the bubbles, which inhibits the collapse and deformation of bubbles during the drying process. A structure composed of hollow capsules is left in the dried monoliths, with polymer layers exposed to the outer side and hydrophobic particles hidden under the shells, as shown in FIGS. 7A and 7B. Formulated liquid foams coated on a glass slide through a casting process had bubbles and exhibited optimal stability in the dried state, as shown in FIG. 8A, and display a water contact angle larger than 150°, as shown in FIG. 8B. The coating can be applied to different substrates with regular or irregular surfaces such as a polyurethane (PU) sponge.

Figure 9A:
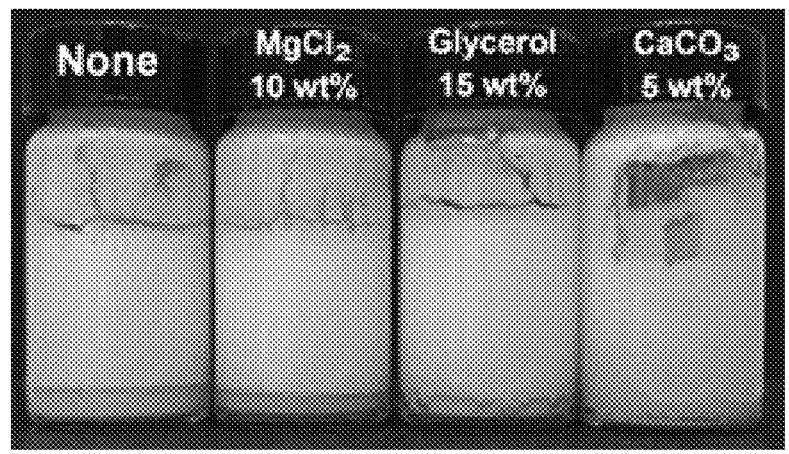
FIG. 9A shows a photograph of wet foams prepared by frothing H18 silica particles and PVA with different additives labeled above the vials with the additive concentration and where the samples with $MgCl_2$ and glycerol are glutaraldehyde cross-linked.
Figure 9B:
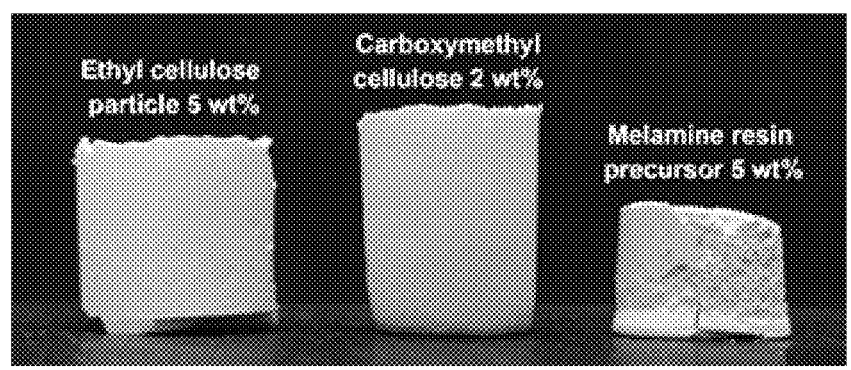
FIG. 9B shows porous monoliths templated from wet foams by frothing H18 silica particles and PVA with different additives whose concentration in water is labeled above the monolith.

Owing to the nature of these novel foams, which have high tolerance to the surroundings, such as salts and pH, various additives are easily incorporated into the system by simply dispersing them in the aqueous phase, resulting in the formation of different porous monoliths, as shown in FIG. 9A. In certain embodiments, ultra-stable foams are achieved by frothing hydrophobic particles, such as H18 silica particles, with various hydrophylic polymers in the presence of salts, preferably 20 wt. % $MgCl_2$. Under similar conditions, the surfactant sodium dodecyl sulfate would fail to modulate the hydrophobic nanoparticles. Foams, according to embodiments of the invention, can be used to create more complicated and hierarchical structures by incorporation of additives, as shown in FIG. 9B, or by using monomers or precursors in the continuous phase to enable unprecedented material designs for a myriad of applications such as separation membrane, energy conversion/storage and other functional materials.

EXAMPLES

Example 1—Visualizing the Ultrastable Foam

Figure 3A:
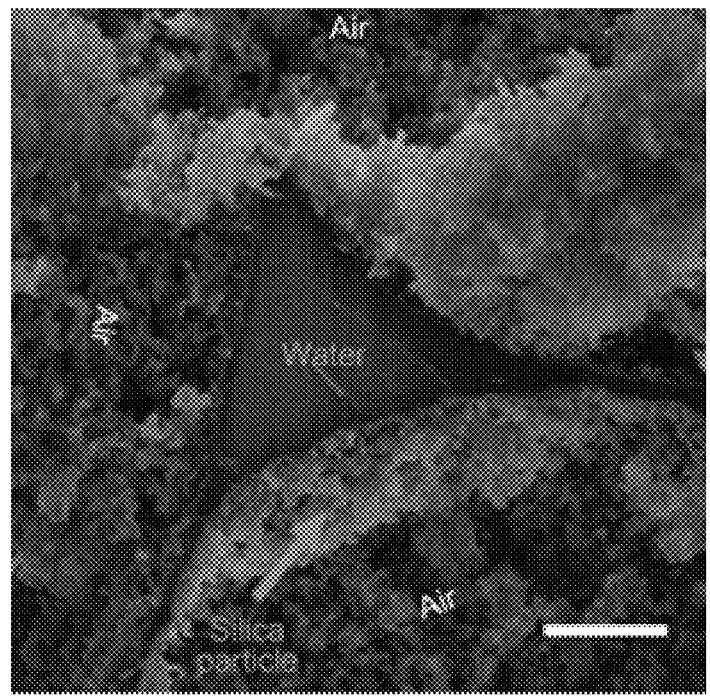
FIG. 3A shows a Cryo-SEM image of the foam at a H18 silica (0.3 g)-PVA (3 g 5 wt. %) film mixed interface after draining for 1 day, scale bar=2 µm.
Figure 3B:
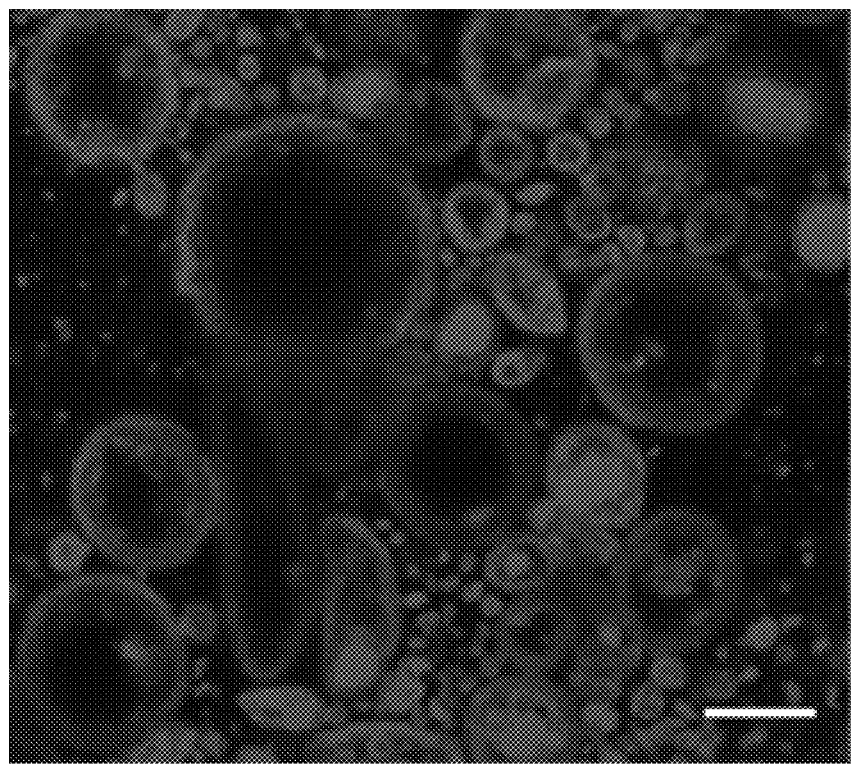
FIG. 3B shows a CLSM image of the equivalent foam of FIG. 1E that is Nile red-labelled H18 silica particles (0.3 g) and 3 g 5 wt. % PVA solution, scale bar=10 µm. The red color represents H18 silica particles.
Figure 3C:
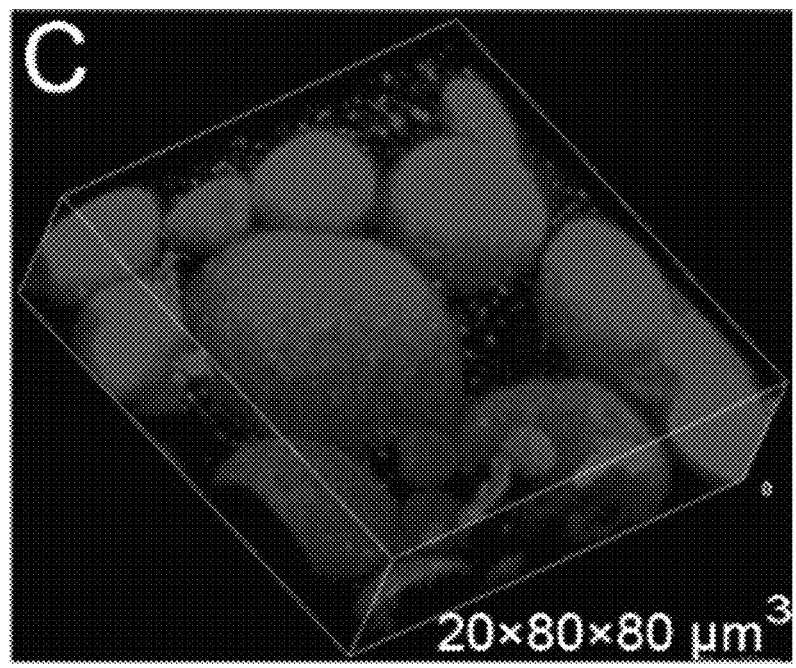
FIG. 3C shows a reconstruction of the 3D model of fluorescent H18 particles adsorbed around foam bubbles. The red color represents H18 silica particles.

The confocal image indicates, as shown in FIG. 3B, that the fluorescently labelled hydrophobic silica particles, using physically absorbed Nile red, show the red (bright) features that are distributed inside air bubbles or accumulated at the air-water interface but not in the water phase. FIG. 3A shows a scanning electron cryomicroscopy (Cryo-SEM) image of the foam at a H18 silica-PVA film mixed interface after draining for 1 day, in which it is clear that the silica particles reside within the air bubble and at the water-air interface.

Figure 3D:
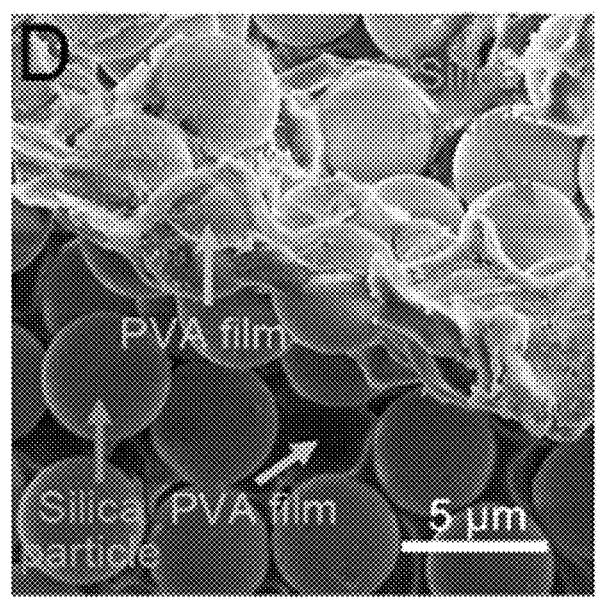
FIG. 3D shows an SEM image of the foam prepared by 0.3 g hydrophobic silica particles (4.4 µm) and 3 g of 0.5 wt. % PVA solution after vacuum drying, scale bar=5 µm.
Figure 4B:
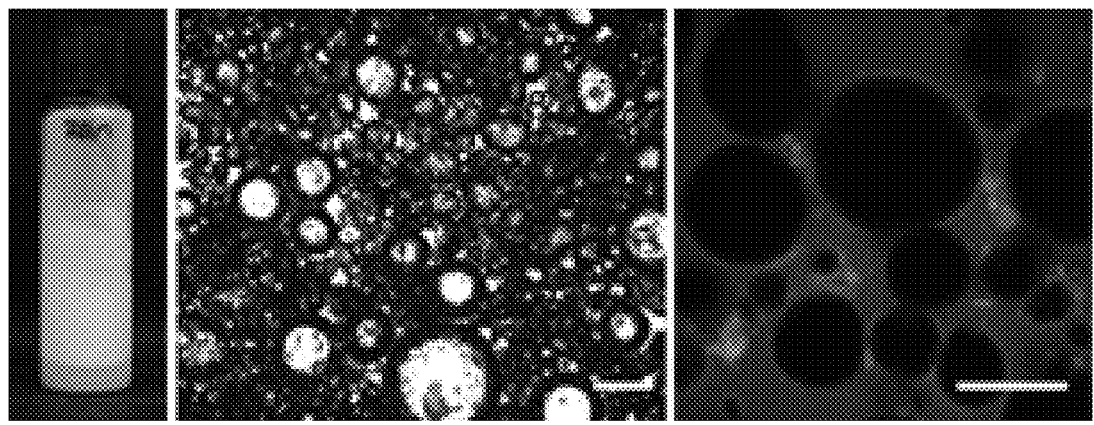
FIG. 4B shows optical and CLSM images of fluorescent zein microgels (3 g; 5 wt. %) with H18 silica particles (0.3 g), according to an embodiment of the invention, where scale bar for optical image=200 µm, scale bar for CLSM image=50 µm,b, where the light features are zein microgels in the right image.
Figure 4C:
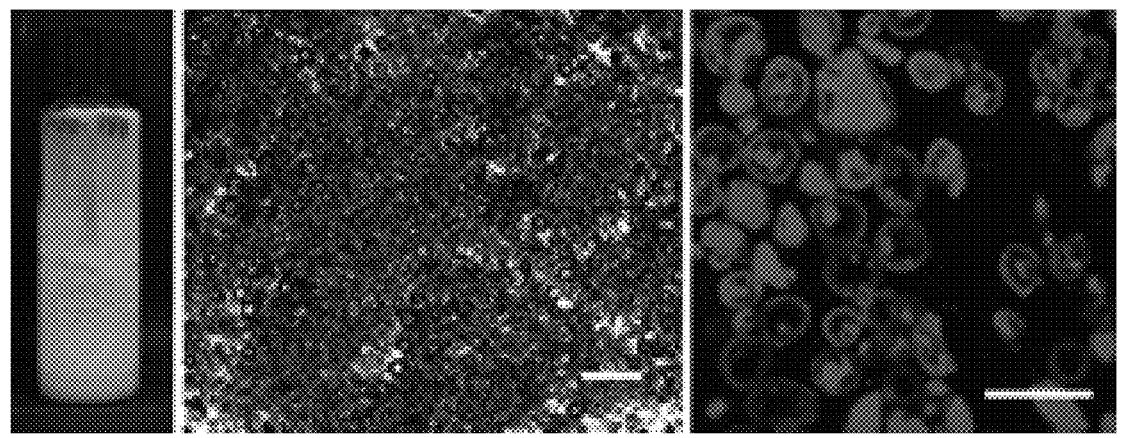
FIG. 4C shows optical and CLSM images of PVA (3 g; 5 wt. %) with fluorescent perfluorinated N20 silica particles (0.3 g), according to an embodiment of the invention, where scale bar for optical image=200 µm, scale bar for CLSM image=50 µm, where light features are silica particles in the right image.
Figure 4D:
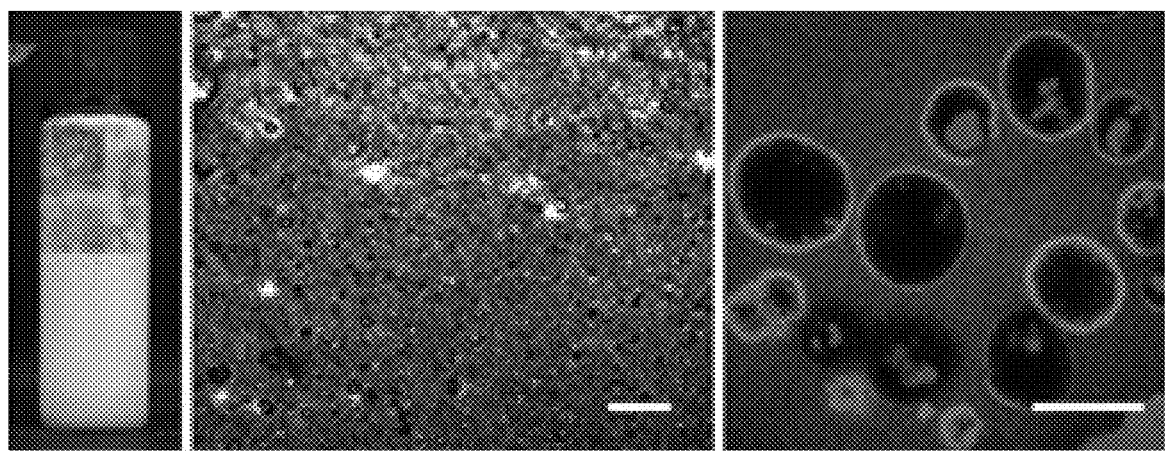
FIG. 4D shows optical and CLSM images of fluorescent BSA (3 g; 5 wt. %) with fluorescent perfluorinated N20 silica particles (0.3 g), according to an embodiment of the invention, where scale bar for optical image=200 µm, scale bar for CLSM image=50 µm, where the light cellular features are silica particles and the diffuse light features are BSA.

Because of the poor wettability of the hydrophobic H18 particles by water, an accumulation of silica particles on the inside of the air bubbles results in the formation of a dense layer of particles at the interface, which is apparent in the confocal image shown in FIG. 3B. Distinct deviation of the bubbles from spherical indicates a high rigidity of the silica particle shells. The rough appearance of the particles and their aggregates suggest that the particles adhered to the interface due to their natural hydrophobicity without modification by PVA molecules. FIG. 3D shows an SEM image of the foam prepared by 0.3 g hydrophobic silica particles (4.4 μm) and 3 g of 0.5 wt. % PVA solution after vacuum drying, where the association of the PVA with the H18 silica-PVA.

FIG. 3E shows a CLSM image of foam stabilized by perylene-labelled H18 silica particles (0.1 g) and 5 g 0.5 wt. % RB-labelled PNIPAM microgel solution. The blue color presents the H18 silica, while the red dots present microgels. The ultra-stability of the foams from this mixture is consistent with formation of a mixed monolayer structure, as shown in FIG. 3F, which is a schematic illustration of the mixed monolayer containing particle-polymer or particle-particle bilayer around air bubbles comprising hydrophobic particles and a hydrophilic polymer, protein, or colloidal particles. Because of the superhydrophobicity, the H18 silica nanoparticles only attach to the interface from the air phase, forming a rough shell layer at the inner side of the bubbles, indicated by the blue color in FIG. 3E, with simultaneous absorption of the PNIPAM microgels at the boundary of the bubbles, the red features in FIG. 3E, due to their high interfacial activity, a secondary layer at the outer boundary of the bubbles. Due to the properties of the amphiphilic polymer and hydrophobic particle, the interface is simultaneously covered by both kinds of the colloids, forming a mixed monolayer in-situ with a Janus structure.

Materials and Methods

Materials

Commercial fumed silica particles with various percentages of silanol groups (N20—100%, H18—20%, H20—50% and H30—50%) were supplied by Wacker Chemie. Poly (vinyl alcohol), PVA 31,000 g/mol, 86.7-88.7 mol. % hydrolyzed), zein protein from Maize, glutaraldehyde (50 wt. % in water), and magnesium chloride hexahydrate (>98%) were purchased from Sigma-Aldrich. N-isopropyl acrylamide (NIPAM, 97%) and N,N'-methylene-bis-acrylamide (MBA, 99%) were from Fluka. Methacryloxyethylthiocarbonyl rhodamine B was obtained from Polysciences. Methacrylic acid (MAA, >99%) and potassium persulfate (KPS, >99%) were from Merck. Bovine serum albumin (BSA, 98%), fluorescein isothiocyanate (FITC, 90%), Nile red (97.5%) and trichloro(1H,1H,2H,2H-perfluorooctyl)silane (97%) were from J & K Chemical. Methyl cellulose (20-30 mPa s, 2% in water at 20° C.) and melamine monomer (>97%) were purchased from TCI Development Co. Ltd. Calcium carbonate nanoparticles (20 nm, 99%) were from DK Nano. All chemicals were used without further purification, unless stated otherwise. Deionized water was used to prepare all of the solutions.

Synthesis of Fluorescent (PNIPAM-Co-MAA) Microgel

The synthetic procedure for microgels possessing a negative surface charge is from Kwok e al. *Frontiers in Chemistry* 6, (2018). NIPAM was recrystallized using a 1:1 toluene/n-hexane mixture, and MBA was recrystallized using methanol. Specifically, 1.0 g NIPAM, 50 mg MBA, 1 mg methacryloxyethylthiocarbonyl rhodamine B, and 200 μL MAA were first dissolved in 80 mL water, transferred to a 250 mL flask held at 60° C., and purged with nitrogen gas for 1 h. A solution of 0.09 g KPS dissolved in 3 mL water was injected dropwise to initiate polymerization. After 3 h, microgel particles were centrifuged and washed twice with water.

Synthesis of Cross-Linked Zein Microgel

The synthetic procedure for zein particles is from de Folter et al. *Soft Matter* 8, 6807-15 (2012). To 1200 mL of pure water was added 10.0 g zein dissolved in 400 mL aqueous ethanol solution (80% v/v) with vigorous stirring, followed by addition of 1 mL glutaraldehyde solution (50 wt. % in water). After 2 h of cross-linking, the zein particles were separated by centrifugation and washed twice with water. The dispersion was stored in a refrigerator, after which a small amount of large aggregates was observed. The size of the as-prepared zein particles (about 120 nm) was measured by dynamic light scattering.

Synthesis of Perfluorinated Silica Nanoparticles

Silica nanoparticles were perfluorinated by treating them with trichloro(1H,1H,2H,2H-perfluorooctyl) silane. In a typical experiment, 2.0 g of hydrophilic silica particles (N20) were dispersed in 20 mL hexane and then 0.2 mL of fluorosilane reagent was added under continuous stirring. After 24 h reaction, the fluorinated silica nanoparticles were collected and purified by centrifugation, washed with hexane five times, and vacuum dried at room temperature.

Synthesis of Fluorescent Particles

Hydrophobic nanoparticles were labelled with fluorescent dye by physical adsorption. In preferred embodiments, 0.5 g of H18 silica dispersed in 20 mL hexane and 5 mg of Nile red were added under continuous stirring. After 24 h, the silica nanoparticles were collected and purified by centrifugation, washed with hexane three times, and vacuum dried at room temperature. Protein particles (BSA proteins and crosslinked zein nanoparticles) were labelled with FITC by chemical reaction in water. The labelled protein particles were used without any further purification.

Preparation of Silica-Polymer Composite Foams

The composite foams were fabricated by a one-step direct foaming process as shown in FIGS. 1A, 1B, 1C, 1D, and 1E. In a typical procedure, PVA solution (e.g. 3.0 g of 5 wt. %) was placed in a glass vessel and hydrophobic H18 silica particles (e.g. 0.3 g) were added and allowed to float on the surface. The particle/solution mixtures were violently frothed by homogenization (homogenizer: T 25 digital Ultra-Turrax, IKA; dispersing stator: S25N-10G-ST) for 2 min at 20,000 rpm to obtain a homogeneous wet foam. The obtained wet foams were sealed and stored at room temperature for further experiments.

Preparation of Ultra-Stable Foams of Varied Composition

Foams with different polymers and/or particles were prepared using the method described above with substitution for PVA. In preferred embodiments, hydrophilic particles e.g. proteins or PNIPAM-based particles and/or water-soluble polymers e.g. PVP or methylcellulose were first dispersed in water and then hydrophobic particles were added and allowed to float on the dispersion. The resulting mixtures were violently frothed by homogenization at 20,000 rpm for a few min to obtain homogeneous wet foams. For example, BSA-based composite foam was prepared by dissolving 0.25 g BSA in 4.75 g of water and 0.5 g of H20 silica particles were added on the solution surface. After homogenization, BSA-H20 silica wet foams were obtained. By selecting the colloidal system, the concentrations of the two agents and homogenization speed and time, foams possessing different air content, mean bubble size, and stability were obtained.

Preparation of Porous Monoliths Templated from Foams

Precursor wet foams were fabricated in a two-step foaming process. In a typical procedure, PVA solution (e.g. 3.0 g of 5 wt. %) was mixed with glutaraldehyde and/or other incorporated compounds (most of the water-soluble compounds, such as acids, salts ($MgCl_2$, $NH_4Cl$, $PdCl_2$) and particles (N20, ethyl cellulose powders) did not affect the formation of stable foams. Compounds with interfacial activity affect foam stability. To these compositions was added H18 silica particles (e.g. 0.3 g) followed by violent frothing to obtain homogeneous foam. The foam was frothed a second time for 30 s. This wet foam, which is useful for surface coating or as inks for 3D printing, were stored at room temperature for further cross-linking reaction. Finally, the solidified foams were slowly dried in air to fabricate porous monoliths.

Mold Casting of H18-PVA Composite Foams

The wet foams were fabricated by a two-step frothing process. In a first step, 3.0 g of PVA solution (5 wt. % containing 10 wt. % $MgCl_2$ and 0.5 wt. % glutaraldehyde) and 0.3 g of H18 silica particles were foamed into homogeneous wet foams. In a second step, 20 μL of 1 M HCl solution was added, and the mixtures were further frothed by homogenization for a few min at 20,000 rpm to obtain raw materials for mold casting. After pouring into molds, which were made of a glass pallet (the substrate) and silicone rubber (containing the molds), the shaped wet foams were maintained statically at room temperature to cross-link. Colorful foams were prepared by incorporating 0.2 wt. % methyl orange or methylene blue in the aqueous phase.

Characterization of Foams

Photographs of samples in glass vials and videos were acquired with a digital camera. The morphologies of the foams were characterized by an optical microscope fitted with a digital camera (Olympus BX51WI). Static contact angles were measured using a Kriiss DSA30b instrument. Confocal laser scanning microscopy (CLSM) images were obtained with a Nikon Eclipse Ti inverted microscope. Scanning electron microscopy (SEM) images were acquired with a Quanta 400F instrument on dried samples sputter-coated with gold (Elionix SC-701 Quick Coater). Cryo-SEM images were obtained by cold field emission SEM (Hitachi S-4800) coupled with a Quorum PP3010T preparation system.

All publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

We claim:

1. An ultra-stable aqueous foam, comprising one or more hydrophobic particles residing within bubbles in an aqueous solution of one or more hydrophilic polymers, one or more proteins, or one or more aqueous dispersible colloidal particles, wherein
   the hydrophobic particles are polydimethylsiloxane functionalized silica, perfluorinated alkyl functionalized silica, alkylated silica, polytetrafluoroethylene (PTFE), or polyvinylidene fluoride (PVDF) particles;
   the hydrophilic polymer is polyvinyl alcohol (PVA), poly(ethyleneglycol) (PEG), polyvinylpyrrolidone (PVP), or methyl cellulose;
   the protein is bovine serum albumin (BSA); and
   the aqueous dispersible colloidal particles are poly(N-isopropyl acrylamide) (PNIPAM)-based microgels or cross-linked zein proteins.

2. The ultra-stable aqueous foam according to claim 1, wherein the ratio of the hydrophobic particles to the hydrophilic polymer, the protein, or the aqueous dispersible colloidal particles is 3:4 to 20:1 and wherein the concentration of the hydrophilic polymer, the protein, or the aqueous dispersible colloidal particles is 0.1 to 10 wt. %.

3. The ultra-stable aqueous foam according to claim 1, further comprising a cross-linker.

4. The ultra-stable aqueous foam according to claim 3, wherein the cross-linker is glutaraldehyde.

5. The ultra-stable aqueous foam according to claim 1, further comprising a multiplicity of second particles or small molecular additives.

6. The ultra-stable aqueous foam according to claim 5, where the second particles are hydrophilic silica particle or ethyl cellulose powder, and the small molecular additives are inorganic salts or melamine.

7. A porous monolith, comprising the ultra-stable aqueous foam according to claim 1, wherein the ultra-stable aqueous foam is crosslinked.

8. A method of preparing the ultra-stable aqueous foam according to claim 1, comprising:
   providing an aqueous solution of the hydrophilic polymer or the protein; or
   providing an aqueous dispersion of the aqueous dispersible colloidal particles;
   providing a multiplicity of the hydrophobic particles;
   adding the multiplicity of hydrophobic particles to the aqueous solution or the aqueous dispersion to form a mixture; and
   agitating the mixture to form the ultra-stable aqueous foam.

9. The method according to claim 8, wherein the concentration of the hydrophilic polymer, the protein, or the aqueous dispersible colloidal particles is at 0.1 to 10 wt. %.

10. The method according to claim 8, wherein the hydrophilic polymer is polyvinyl alcohol (PVA), poly(ethyleneglycol) (PEG), polyvinylpyrrolidone (PVP), or methyl cellulose.

11. The method according to claim 8, wherein the protein is bovine serum albumin (BSA).

12. The method according to claim 8, wherein the aqueous dispersible colloidal particles are poly(N-isopropyl acrylamide) (PNIPAM)-based microgels or cross-linked zein protein.

13. The method according to claim 8, wherein the hydrophobic particles are polydimethylsiloxane functionalized silica, or perfluorinated alkyl functionalized silica, or alkylated silica particles.

14. The method according to claim 8, wherein the agitating is shaking, stirring, homogenizing, or high shear mixing.

* * * * *